PLATFORM ATTACHMENT FOR CRANES

Original Filed Nov. 20, 1967 2 Sheets-Sheet 1

INVENTORS
Roger S. Chapman, Jr.
Philip Pilletere, Jr.

BY De Lio and Montgomery
ATTORNEYS

PLATFORM ATTACHMENT FOR CRANES

Original Filed Nov. 20, 1967 2 Sheets-Sheet 2

INVENTORS
Roger S. Chapman, Jr.
Philip Pilletere, Jr.

BY
DeLio and Montgomery
ATTORNEYS

United States Patent Office

Re. 27,349
Reissued May 9, 1972

27,349

PLATFORM ATTACHMENT FOR CRANES

Roger S. Chapman, Jr., 93 Mohawk Drive, Wallingford, Conn. 06492, and Philip Pilletere, Jr., 189 Winslow Drive, West Haven, Conn. 06516

Original No. 3,481,488, dated Dec. 2, 1969, Ser. No. 684,349, Nov. 20, 1967. Application for reissue Sept. 19, 1970, Ser. No. 65,029

Int. Cl. B66c

U.S. Cl. 212—1 8 Claims

Matter enclosed in heavy brackets [ ] appears in the original patent but forms no part of this reissue specification; matter printed in italics indicates the additions made by reissue.

ABSTRACT OF THE DISCLOSURE

This disclosure relates to a platform attachment for cranes for carrying auxiliary equipment such as air compressors. The platform has foldable legs with each of the legs carrying jacking means so that the platform may be supported on its own legs and moved into engagement with attachment means on the crane. When the platform is supported on the crane the legs are folded beneath the platform.

This invention relates to cranes, and more particularly relates to cranes which utilize a platform mounted thereon for an air compressor or other such auxiliary device.

In cranes of the type used in construction work for driving piles it is often required that a source of compressed air be available for operating the pile-driving mechanism. At the present time, it is the practice to mount a platform on the counterweight of the crane with further attachment from the platform to the crane gantry and carry the air compressor thus mounted on such platform. The construction of such attachable platform is such that another crane or lifting device is required to lift the platform from the counterweight of the crane and load it on an equipment-moving vehicle for transportation to a new site.

Accordingly, the present invention, to overcome these deficiencies and limitations, provides a new and improved platform and attachment therefor to a crane which allows the platform to be removable from the crane without requiring an additional crane or lifting device and which also allows the platform to be attached to the crane without requirement for an additional lifting device.

Briefly stated, the invention is one form thereof, comprises a platform having foldable legs with jacks therein which allows the platform to be elevated and depressed so as to be attached to and removed from the counterweight of the crane, while it is supported on its own supporting structure on the ground.

An object of this invention is to provide a platform for attachment to a crane for supporting auxiliary equipment which may be attached to and detached from the crane without the necessity of additional lifting equipment.

Another object of this invention is to provide such a platform which has supporting legs which are foldable beneath the platform and which legs also include self-contained jacks for raising and lowering the platform.

A further object of this invention is to provide a new and improved platform of the type described wherein the legs thereof contain self-jacking means and which may be easily folded for loading on the platform on an equipment-moving vehicle.

The features of the invention which are believed to be novel are set forth with particularity and distinctly claimed in the concluding portion of this application. The invention, however, both as to its operation and organization, together with further objects and advantages thereof may best be appreciated by reference to the following detailed description taken in conjunction with the drawings, in which:

Figure 1:
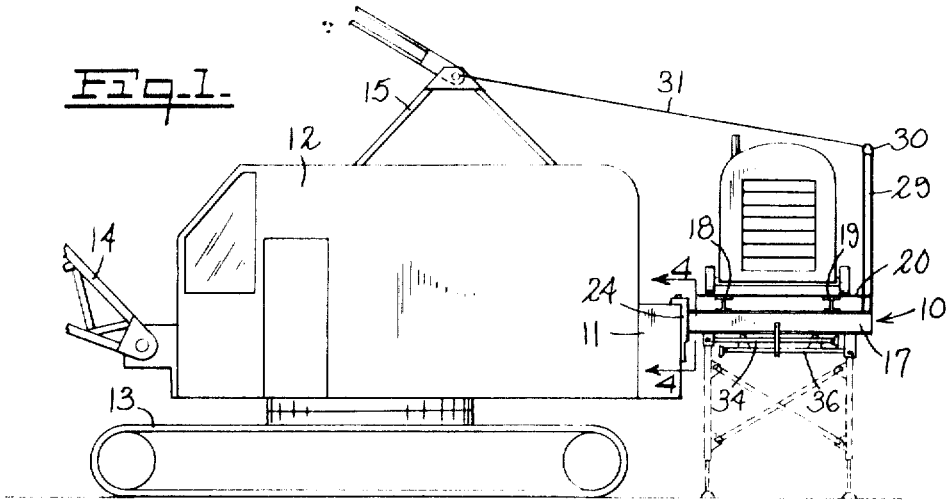
FIG. 1 is a side elevation of a crane showing a platform embodying the invention mounted thereto.

The invention is shown in FIG. 1 as a platform 10 attached to the counterweight 11 of a crane 12 having the usual crawler-type mechanism 13, a boom 14, and a gantry 15.

Figure 3:
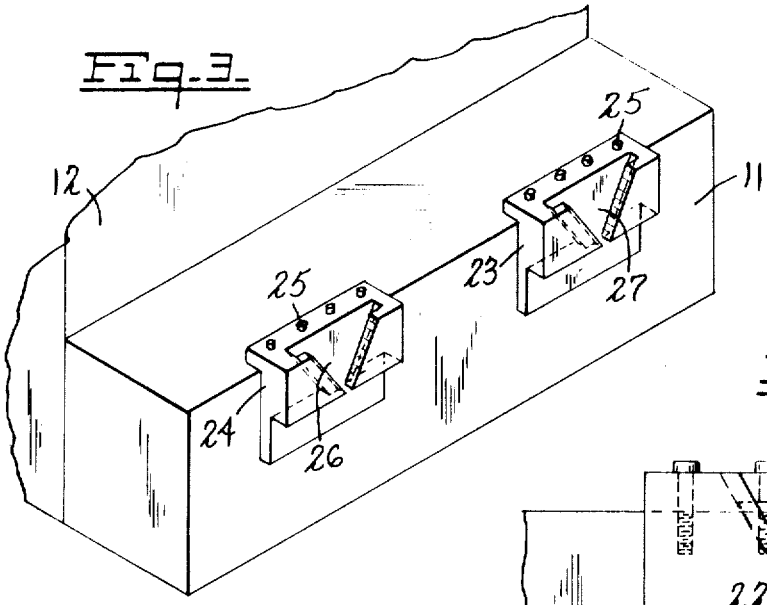
FIG. 3 is a view in perspective of a counterweight of a crane showing typical brackets that may be utilized for attaching the platform thereo.
Figure 4:
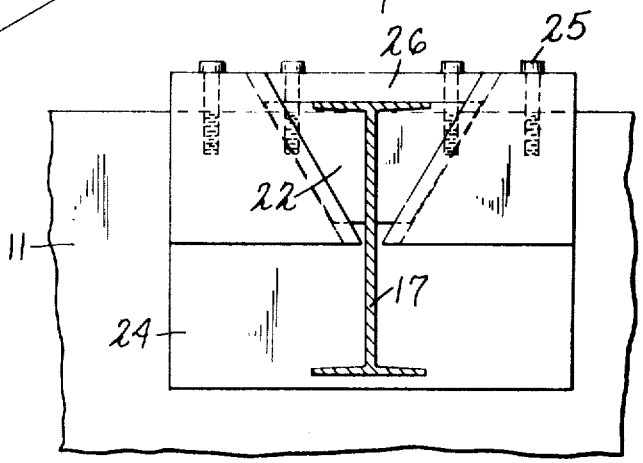
FIG. 4 is a view partially in section seen in the plane of lines 4—4 of FIG. 1.

The platform assembly, in one form of the invention, comprises a pair of beams 16 and 17 supporting another pair of transverse beams 18 and 19. Mounted atop beams 18 and 19 is a platform-providing member 20 which is preferably in the form of heavy mesh material. Secured to the mounting ends of beams 16 and 17 are key-shaped plates 21 and 22 adapted to lock the platform 10 to the counterweights or other attaching member of the crane. Carried on the counterweight 11, as more clearly shown in FIG. 3, are a pair of spaced apart brackets 23 and 24 secured to the counterweight 11 as by a plurality of bolts 25 and defining slots 26 and 27 therein adapted to receive the key-shaped plates 21 and 22. The platform 10 is further supported on the crane from the gantry 15.

A cross-beam 28 is supported as by welding between beams 16 and 17. Extending from cross-beam 28 is an upright post 29 having an eyelet-type bracket 30 thereon adapted to have attached thereto a heavy cable 31 which is, in turn, secured to gantry 15.

The platform 20 is supported as shown on four legs 33, 34, 35 and 36 which in the illustrated embodiment of the invention actually comprise two pairs of two legs. The pair of legs 35 and 36 are each pivotally connected to platform 10 in U-shaped brackets 37 and 38, respectively, carried on the undersurface of beams 16 and 17, respectively. The legs 35 and 36 are pivotal about pins 39 and 40 carried between the arms of brackets 37 and 38. Legs 33 and 34 are pivotally connected to brackets 41 and 42, respectively, carried on the undersurface of beams 16 and 17. The legs 33 and 34 are pivoted about pins 43 and 44, respectively, carried by the brackets 41 and 42, respectively.

For reasons hereinafter made apparent, the pivot points of the legs 35 and 36 are lower from the surface of platform member 20 than the pivot points of legs 33 and 34.

Legs 33 and 34 are permanently cross-braced as by members 45 and 46. Legs 35 and 36 are also permanently cross-braced by members 45 and 46. With the construction of the legs thus far described, it will be seen that the legs 33 and 34 may be pivoted up under platform 10, and then the legs 35 and 36 may be pivoted under legs 33 and 34.

Legs 34 and 36 and 33 and 35 are also cross-braced with detachable connections to allow folding of the legs. Cross-brace members 48 and 49 extend between legs 34 and 36. Leg 34 carries a bracket member 50 thereon to which is removably pined cross-member 49 by means of a pin 51. Cross-member 49 is also pivotally connected to an upper portion of leg 36 by means of a bracket 52 carried thereon. Cross-member 49 at the upper end thereof is connectable to bracket 52 by means of a pin 53.

In a similar manner, a bracket 54 carried toward the upper end of leg 34 has one end of cross-member 48 removably pinned thereto and the other end of cross-member 48 is adapted to be pinned to bracket 55 carried by leg 36 at the lower end thereof.

Figure 5:
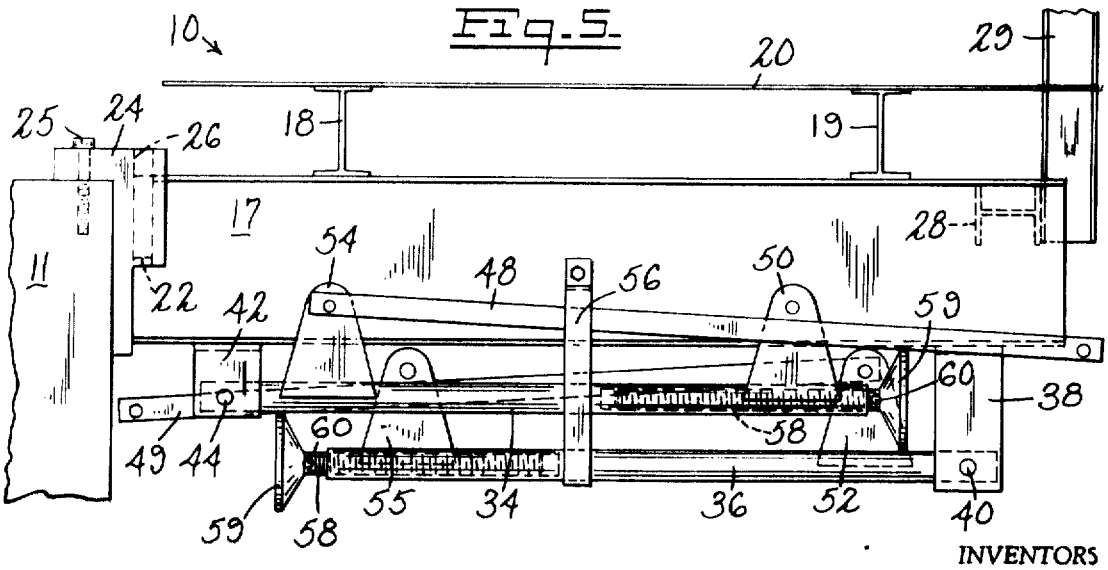
FIG. 5 is a view in elevation of the platform with its legs folded.

With this arrangement, the under structure or legs may be folded into the position shown in FIG. 5, when the platform is attached to a crane, as more clearly shown in FIG. 1. To retain the under structure in a folded position one or more L-shaped brackets or retainers may be provided at either side of the platform as indicated at 56.

Figure 2:
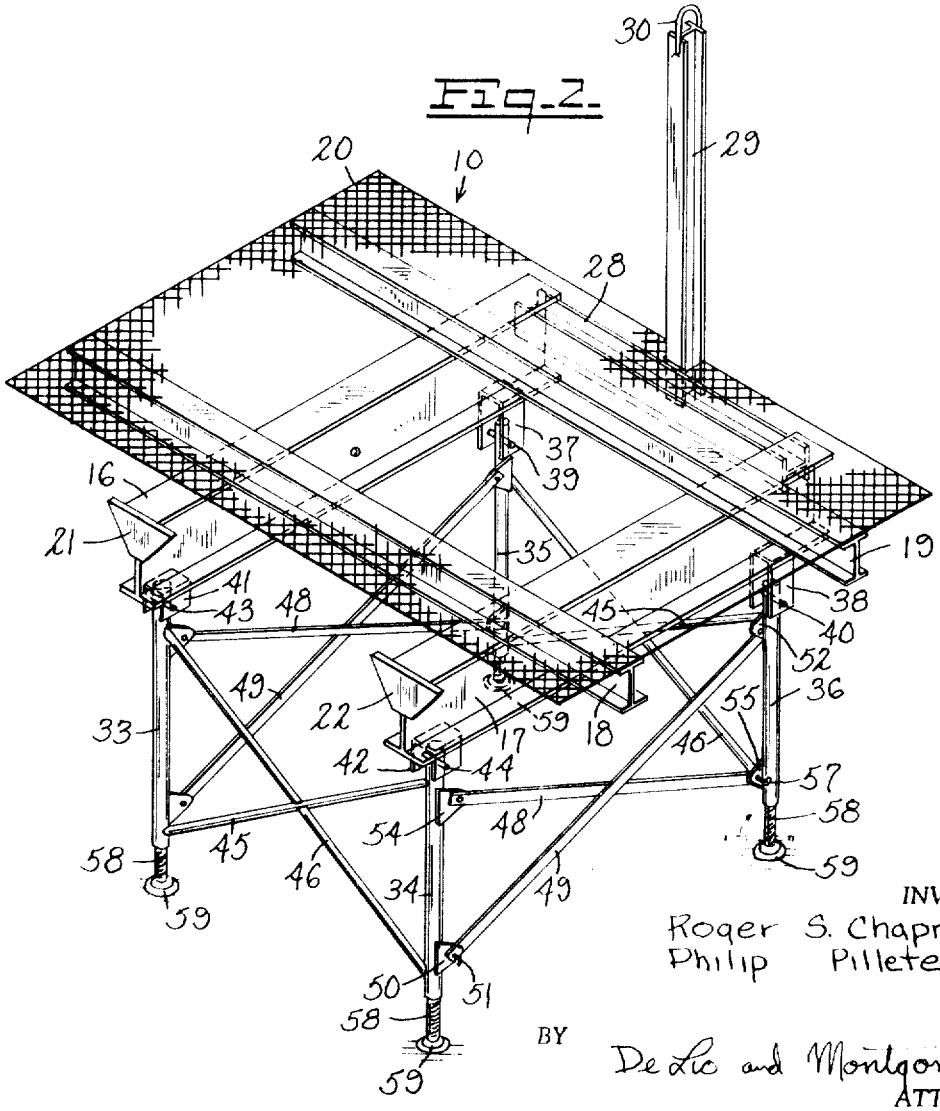
FIG. 2 is a view in perspective of a platform embodying the invention resting on its own supporting structure.

In the extended position, with the legs adapted to support the platform 10, the entire assembly is shown in FIG. 2.

In practice, let it be assumed that the crane together with the platform have been moved onto an operation work site. The crane may be utilized to lift the platform from its transportation vehicle. At this time, the retaining brackets 56 are removed, or otherwise manipulated, to allow the legs 33, 34 35 and 36 to swing down to a vertical position. Then the cross-bracing members 48 and 49 are pivotally moved into brackets 50 and 55 and connected thereto by means of pins 51 and 57, respectively. At this time, the platform is resting on its own legs and on the ground. Then jack screws 58, threadably received in each of the legs and rotatable in feet 59, are turned as by means of a crank inserted in apertures 60 to raise the platform to the desired height. In this position the keys 21 and 22 are above the slot 26 in the members 23. Then the telescoping legs are lowered so that the tongues 21 are received within the grooves 26 and 27. The cable 31 is then connected between bracket 30 and gantry 15. At this point, the platform is rigidly connected to the crane and the legs may be folded and secured underneath the platform as shown in FIGS. 1 and 5. Thereafter, the crane with compressor thereon is ready for operation.

When the work has been completed at a particular work site the legs are folded beneath platform 10 so that platform 10 is supported on its own legs. At this time, the jack screws 58 may be turned to raise the platform and remove the tongues 21 and 22 from their connection in grooves 26 and 27 on counterweight 11. The cable 31 is disconnected from between the gantry and eyelet 30. The crane may now turn around and remove the compressor, and then lift the platform 10 to allow the legs thereof to be folded beneath, and then load the platform on its transportation vehicle for movement to the next site.

With this arrangement no additional lifting equipment is required to mount the platform and compressor on the crane.

It will thus be seen that the objects of the invention are efficiently attained. While a preferred embodiment of the invention has been set forth for purposes of disclosure, modifications to the disclosed embodiment of the invention as well as other embodiments thereof may occur to those skilled in the art.

What is claimed is:

1. For use in combination with a crane; an auxiliary power platform, means carried by the crane and said platform for detachably mounting said platform to a crane in a substantially horizontal plane, a plurality of legs for supporting said platform in a free standing position, means pivotally mounting said legs to said platform to allow said legs to be folded beneath said platform, said detachable mounting means comprising means on one of said crane and said platform defining vertically directed retaining socket means, and means on the other of said crane and said platform defining a locking means constructed and arranged to vertically move into and out of platform supporting engagement with said retaining socket means, and means for adjusting the length of each of said legs.

2. For use in combination with a crane; an auxiliary power platform, means carried by the crane and said platform for detachably mounting said platform to a crane in a substantially horizontal plane, said mounting means comprising cooperating members on said crane and said platform arranged to atach or detach said platform to and from said crane, respectively, upon predetermined relative vertical movement between the crane and said platform, a plurality of legs for supporting said platform in a free standing condition, and means pivotally mounting said legs to said platform to allow said legs to be folded beneath said platform.

3. The invention of claim 2 wherein said means for attaching comprises cooperating locking elements mountable to a counterweight on said crane and on said platform.

4. The invention of claim 2 further including an upright member secured to said platform on the side thereof opposite said securing means, the crane having a gantry, and cable means extending from said upright member to the gantry.

5. The invention of claim 2, wherein said legs threadably receive extensions within the lower ends thereof to adjust the length of said legs and permit jacking of said platform.

6. The invention of claim 2 wherein said legs are in pairs, each pair of legs having permanent cross-bracing therebetween, and disconnectable cross-bracing for connecting one leg of one pair to an adjacent leg of another pair.

*7. For use in combination with a crane; an auxiliary power platform, means carried by the crane and said platform for detachably mounting said platform to a crane in a substantially horizontal plane, a plurality of legs for supporting said platform in a free standing position, means retractably mounting said legs to said platform to allow said legs to be withdrawn from a platform supporting position beneath said platform, said detachable monting means comprising means on one of said crane and said platform defining vertically directed retaining socket means, and means on the other of said crane and said platform defining a locking means constructed and arranged to vertically move into and out of platform supporting engagement with said retaining socket means, and means for adjusting the length of each of said legs.*

*8. For use in combination with a crane; an auxiliary power platform, means carried by the crane and said platform for detachably mounting said platform to a crane in a substantially horizontal plane, said mounting means comprising cooperating members on said crane and said platform arranged to attach or detach said platform to and from said crane, respectively, upon predetermined relative vertical movement between the crane and said platform, a plurality of legs for supporting said platform in a free standing condition, and means retractably mounting said legs to said platform to allow said legs to be retracted from a platform supporting position beneath said platform.*

References Cited

The following references, cited by the Examiner, are of record in the patented file of this patent or the original patent.

UNITED STATES PATENTS

| | | | |
|---|---|---|---|
| 1,211,829 | 1/1917 | Eades | 108—148 |
| 1,817,905 | 8/1931 | Gager | 212—28 |
| 3,319,958 | 5/1967 | Bender | 108—131 |

HARVEY C. HORNSBY, Primary Examiner

U.S. Cl. X.R.

212—49, 145